United States Patent
Meng

(10) Patent No.: US 9,414,324 B2
(45) Date of Patent: Aug. 9, 2016

(54) SENSITIVITY TESTING METHOD AND DEVICE AND INSPECTION APPARATUS FOR A GSM COMMUNICATION TERMINAL

(75) Inventor: Lingliang Meng, Huizhou (CN)

(73) Assignee: HUIZHOU TCL MOBILE COMMUNICATION CO., LTD., Huizhou, Guangdong Province (CN)

(*) Notice: Subject to any disclaimer, the term of this patent is extended or adjusted under 35 U.S.C. 154(b) by 176 days.

(21) Appl. No.: 13/514,599

(22) PCT Filed: Mar. 29, 2011

(86) PCT No.: PCT/CN2011/072239
§ 371 (c)(1),
(2), (4) Date: Jun. 7, 2012

(87) PCT Pub. No.: WO2011/160479
PCT Pub. Date: Dec. 29, 2011

(65) Prior Publication Data
US 2013/0005393 A1    Jan. 3, 2013

(30) Foreign Application Priority Data

Jun. 24, 2010 (CN) .......................... 2010 1 0214491

(51) Int. Cl.
H04W 52/24 (2009.01)
H04B 17/29 (2015.01)

(52) U.S. Cl.
CPC ............. H04W 52/241 (2013.01); H04B 17/29 (2015.01)

(58) Field of Classification Search
CPC ................... H04M 1/72519; H04M 1/72522; H04L 1/20; H04L 1/0001; H04L 1/0002; H04L 1/0021; H04L 1/0023; H04W 28/22; H04W 36/30; H04W 52/20; H04W 52/228; H04W 52/241; H04W 52/247; H04W 52/36
USPC ...................................................... 455/550.1
See application file for complete search history.

(56) References Cited

U.S. PATENT DOCUMENTS 5,418,789 A * 5/1995 Gersbach .................. H04L 1/20
375/224
6,097,953 A * 8/2000 Bonta .................... H04W 36/30
455/436

(Continued)

FOREIGN PATENT DOCUMENTS

| CN | 101106432 A | 1/2008 |
|---|---|---|
| CN | 101662781 A | 3/2010 |
| CN | 101873185 A | 3/2010 |
| EP | 1830493 A1 | 9/2007 |

OTHER PUBLICATIONS

"Testing and Troubleshooting Digital RF Communications Receiver Designs", Application Note—Agilent AN 1314, 1999-2000, pp. 3-38, Agilent Technologies, U.S.A.

(Continued)

Primary Examiner — Matthew Sams
(74) Attorney, Agent, or Firm — Cheng-Ju Chiang

(57) ABSTRACT

The present disclosure relates to the technical field of mobile terminal production, and discloses a sensitivity testing method, a sensitivity testing device and an inspection apparatus for a GSM (Global System for Mobile Communications) communication terminal. The sensitivity testing method comprises: acquiring an RX Quality; determining whether the RX Quality is less than a step threshold that is set in a system; and if the RX Quality is less than the step threshold that is set in the system, then reducing a TCH (Traffic Channel) Level of the GSM communication terminal by one step. By using the RX Quality indicator in testing of a GSM communication terminal, the present disclosure determines whether the RX Quality is less than the step threshold that is set in the system, and adjusts the TCH Level of the GSM communication terminal according to the determination result.

16 Claims, 2 Drawing Sheets

(56) References Cited

U.S. PATENT DOCUMENTS

| | | | |
|---|---|---|---|
| 6,728,217 B1* | 4/2004 | Amirijoo | H04L 1/0002 370/252 |
| 2002/0173309 A1* | 11/2002 | Shahidi | H04W 52/143 455/442 |
| 2003/0176184 A1* | 9/2003 | Hakalin | H04L 1/20 455/423 |
| 2004/0101035 A1* | 5/2004 | Boer et al. | 375/219 |
| 2004/0246998 A1* | 12/2004 | Ma et al. | 370/527 |
| 2006/0246938 A1* | 11/2006 | Hulkkonen | H04W 52/12 455/522 |
| 2007/0027757 A1 | 2/2007 | Collins et al. | |
| 2011/0149778 A1* | 6/2011 | Yu | H04W 52/241 370/252 |
| 2013/0005393 A1 | 1/2013 | Meng | |

OTHER PUBLICATIONS

"GSM Measurements with R&S CMU 200 and CMUgo", Application Note—R&S CMU200, pp. 1-46, 2005, Rohde & Schwarz GmbH & Co., U.S.A.

* cited by examiner

SENSITIVITY TESTING METHOD AND DEVICE AND INSPECTION APPARATUS FOR A GSM COMMUNICATION TERMINAL

CROSS REFERENCE TO RELATED APPLICATIONS

The present application is a 35 U.S.C. §371 National Phase conversion of International (PCT) Patent Application No. PCT/CN2011/072239, filed on Mar. 29, 2011, the disclosure of which is incorporated by reference herein. The PCT International Patent Application was published in Chinese.

FIELD OF THE INVENTION

The present disclosure generally relates to the technical field of mobile terminal production, and more particularly, to a sensitivity testing method, a sensitivity testing device and an inspection apparatus for a GSM communication terminal.

BACKGROUND OF THE INVENTION

As use of mobile terminals becomes more and more widespread, users' requirements on performances of the mobile terminals become ever higher. This necessitates strict quality control early during the production process of the mobile terminals.

For radio frequency (RF) testing of the mobile terminals during the production process of the mobile terminals, the requirements become ever higher and many test items must be made. More importantly, the time available for testing becomes increasingly shorter.

During RF testing in the prior art, a GSM terminal sensitivity testing method that is commonly used at present is to adopt an approximation algorithm. Specifically, the power of a base station (BS) is decreased gradually until a bit error rate approximates 2.44%, and a power level that is finally used when the bit error rate approximates 2.44% is defined as the sensitivity.

However, this sensitivity testing method is time consuming, which seriously affects the production efficiency of the mobile terminals.

Accordingly, researches have to be made in the art to solve the problem that the conventional sensitivity testing method consumes much time and leads to a low efficiency.

SUMMARY OF THE INVENTION

An objective of the present disclosure is to provide a sensitivity testing method for a GSM communication terminal, which can solve the problem that the conventional sensitivity testing method consumes much time and leads to a low efficiency.

To achieve the aforesaid objective, the present disclosure provides a sensitivity testing method for a GSM communication terminal, which comprises the following steps of:

acquiring an RX Quality before testing a Class II Ber;

determining whether the RX Quality is less than a step threshold that is set in a system; and if the RX Quality is less than the step threshold that is set in the system, then reducing a TCH Level of the GSM communication terminal by one step.

Another objective of embodiments of the present disclosure is to provide a sensitivity testing device for a GSM communication terminal, which comprises:

an RX Quality acquiring module, being configured to acquire an RX Quality;

an RX Quality determining module, being configured to determine whether the RX Quality is less than a step threshold that is set in a system; and a TCH Level control module, being configured to reduce a TCH Level of the GSM communication terminal by one step if the RX Quality is less than the step threshold that is set in the system.

By using the RX Quality indicator in testing of a GSM communication terminal, embodiments of the present disclosure determine whether the RX Quality is less than the step threshold that is set in the system, and adjust the TCH Level of the GSM communication terminal according to the determination result. Because the RX Quality indicator can roughly reflect the receiving bit error rate, the embodiments of the present disclosure can considerably shorten the testing time, and improve the testing accuracy and the testing efficiency.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

Figure 1:
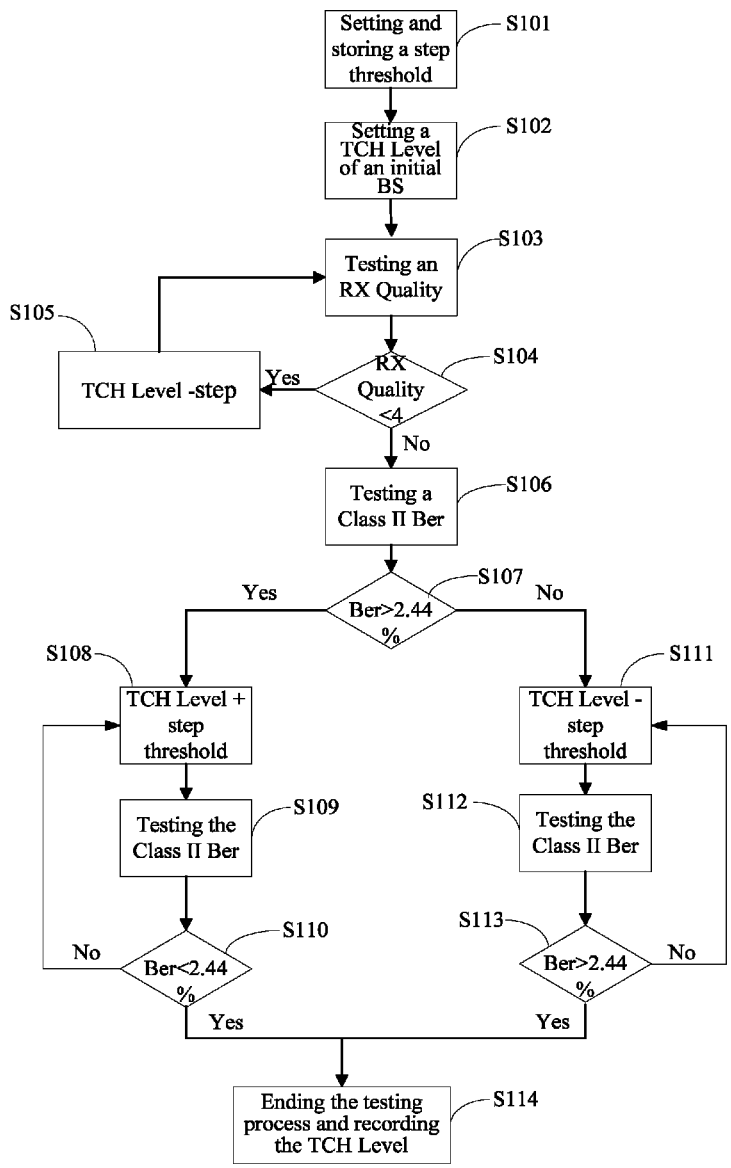
FIG. 1 is a flowchart diagram of a sensitivity testing method for a GSM communication terminal according to an embodiment of the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

FIG. 1 illustrates a process flow of a sensitivity testing method for a GSM communication terminal according to an embodiment of the present disclosure.

Step S101: setting and storing a step threshold;

Step S102: setting a traffic channel level (TCH Level) of an initial base station (BS) of the GSM communication terminal;

Step S103: acquiring a receiving quality RX Quality;

Step S104: determining whether the RX Quality is less than the step threshold that is set in a system; if the answer is "yes", then proceeding to step S105; and otherwise, proceeding to step S106;

wherein the step threshold that is set in the system is 4 (i.e., 4-RX Quality); and because the RX Quality=4 when a bit error rate is 2.44%, the bit error rate of 2.44% can be approximated more quickly;

Step S105: reducing the TCH Level of the GSM communication terminal by one step, wherein 0.5>Step>0, and the bit error rate can be approximated gradually by increasing or reducing the Step;

Step S106: testing a Class II bit error rate (Class II Ber);

Step S107: determining whether the Ber is greater than the bit error rate (the bit error rate here is 2.44%); if the answer is "yes", then proceeding to step S108; and otherwise, proceeding to step S111;

Step S108: increasing the TCH Level of the GSM communication terminal by one step;

Step S109: testing the Class II Ber;

Step S110: determining whether the Ber is less than the bit error rate; if the answer is "yes", then proceeding to step S114; and otherwise, proceeding to the step S108;

Step S111: reducing the TCH Level of the GSM communication terminal by one step;

Step S112: testing the Class II Ber;

Step S113: determining whether the Ber is greater than the bit error rate; if the answer is "yes", then proceeding to the step S114; and otherwise, proceeding to the step S111; and Step S114: ending the testing process and recording the TCH Level.

The present disclosure primarily uses the RX Quality indicator in testing of a GSM communication terminal because the RX Quality indicator can reflect the receiving bit error rate. Therefore, the testing time is shorter than the bit error rate testing time. When the RX Quality is 0, a greater step may be used to reduce the transmission power of the base station; and when the RX Quality is not zero, a smaller step may be used to improve the testing accuracy.

Figure 2:
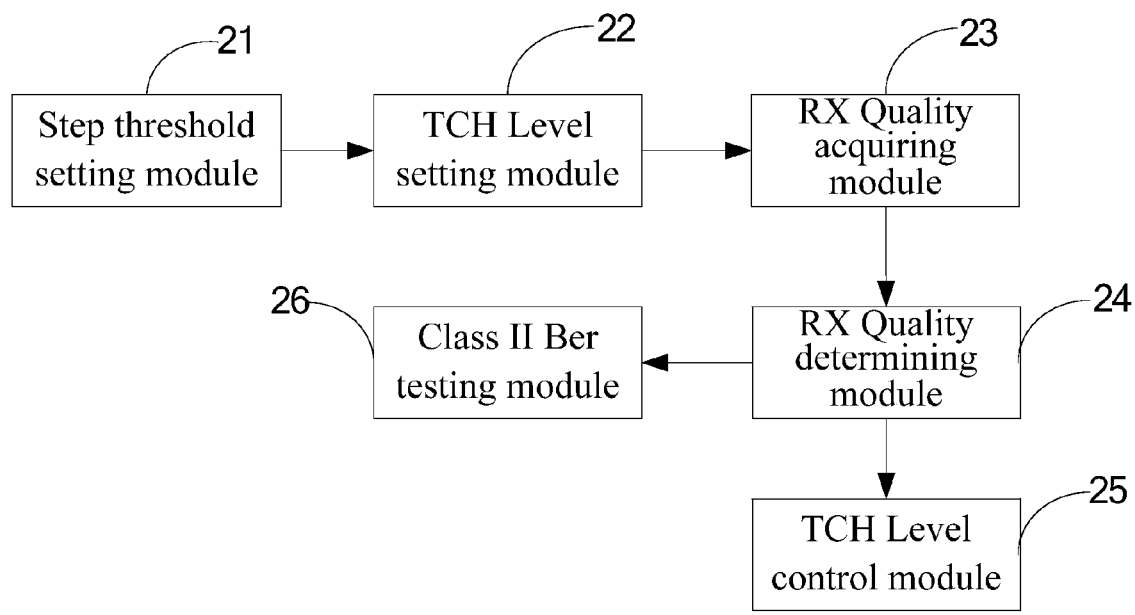
FIG. 2 is a view illustrating a structure of a sensitivity testing device for a GSM communication terminal according to an embodiment of the present disclosure.

FIG. 2 illustrates a structure of a sensitivity testing device for a GSM communication terminal according to an embodiment of the present disclosure.

A step threshold setting module 21 presets and stores a step threshold.

A TCH Level setting module 22 sets a TCH Level of an initial BS of the GSM communication terminal.

An RX Quality acquiring module 23 acquires an RX Quality.

An RX Quality determining module 24 determines whether the RX Quality is less than the step threshold that is set in a system.

Preferably, the step threshold that is set in the system is 4 (i.e., 4-RX Quality).

A TCH Level control module 25 reduces the TCH Level of the GSM communication terminal by one step if the RX Quality determining module 24 determines that the RX Quality is less than the step threshold that is set in the system.

A Class II Ber testing module 26 tests the Class II Ber if the RX Quality determining module 24 determines that the RX Quality is greater than or equal to the step threshold that is set in the system. As the testing process has been detailed above, it will not be further described herein.

An embodiment of the present disclosure further provides an inspection apparatus for a communication terminal. The inspection apparatus comprises the sensitivity testing device for a GSM communication terminal described in the previous embodiment of the present disclosure. As the sensitivity testing device has been detailed above, it will not be further described herein.

By using the RX Quality indicator in testing of a GSM communication terminal, embodiments of the present disclosure determine whether the RX Quality is less than the step threshold that is set in the system, and adjust the TCH Level of the GSM communication terminal according to the determination result. Because the RX Quality indicator can roughly reflect the receiving bit error rate, the embodiments of the present disclosure can considerably shorten the testing time, and improve the testing accuracy and the testing efficiency.

In the aforesaid embodiments, the present disclosure is only described in an illustrative manner. However, upon reading this patent application, those skilled in the art can make various modifications on the present disclosure without departing from the spirits and scope of the present disclosure.

What is claimed is:

1. A sensitivity testing method for a GSM (Global System for Mobile Communications) communication terminal, comprising the following steps of:
   acquiring an RxQual;
   determining whether the RxQual is less than a step threshold that is set in a system;
   if the RxQual is less than the step threshold that is set in the system, then reducing a TCH (traffic channel) Level of the GSM communication terminal by one step value, and returning to the step of acquiring an RxQual;
   if the RxQual is greater than or equal to the step threshold that is set in the system, then testing a Class II Ber (bit error rate);
   wherein when the RxQual is zero, the step value is set to be greater than a predetermined value for reducing a transmission power of a base station; and when the RxQual is not zero, the step value is set to be smaller than the predetermined value for improving an accuracy of the testing.

2. The sensitivity testing method for a GSM communication terminal of claim 1, further comprising the following step before acquiring the RxQual:
   presetting and storing the step threshold.

3. The sensitivity testing method for a GSM communication terminal of claim 1, wherein:
   the step threshold that is set in the system is 4.

4. The sensitivity testing method for a GSM communication terminal of claim 1, further comprising the following step:
   determining whether the Class II Ber is greater than a bit error rate.

5. The sensitivity testing method for a GSM communication terminal of claim 4, further comprising the following step:
   if the Class II Ber is greater than the bit error rate, then increasing the TCH Level of the GSM communication terminal by one step value.

6. The sensitivity testing method for a GSM communication terminal of claim 5, further comprising the following step:
   testing the Class II Ber again; and
   determining whether the Ber is less than the bit error rate; if the answer is "yes", then ending the testing process and recording the TCH Level; and otherwise, proceeding to the step of increasing the TCH Level of the GSM communication terminal by one step value.

7. The sensitivity testing method for a GSM communication terminal of claim 4, further comprising the following step:
   if the Class II Ber is not greater than the bit error rate, then reducing the TCH Level of the GSM communication terminal by one step value.

8. The sensitivity testing method for a GSM communication terminal of claim 7, further comprising the following step:

testing the Class II Ber again; and determining whether the Ber is greater than the bit error rate, if the answer is "yes", then ending the testing process and recording the TCH Level; and otherwise, proceeding to the step of reducing the TCH Level of the GSM communication terminal by one step value.

9. The sensitivity testing method for a GSM communication terminal of claim 4, wherein the bit error rate is 2.44%.

10. The sensitivity testing method for a GSM communication terminal of claim 1, wherein the step value is set as follows: 0.5>the Step Value>0.

11. A sensitivity testing device for a GSM (Global System for Mobile Communications) communication terminal, comprising:

an RxQual acquiring module, being configured to acquire an RxQual;

an RxQual determining module, being configured to determine whether the RxQual is less than a step threshold that is set in a system; and a TCH (traffic channel) Level control module, being configured to reduce a TCH Level of the GSM communication terminal by one step value if the RxQual is less than the step threshold that is set in the system; and a Class II Ber (bit error rate) testing module, being configured to test the Class II Ber if the RxQual determining module determines that the RxQual is greater than or equal to the step threshold that is set in the system;

wherein when the RxQual is zero, the step value is set to be greater than a predetermined value for reducing a transmission power of a base station; and when the RxQual is not zero, the step value is set to be smaller than the predetermined value for improving an accuracy of the testing.

12. The sensitivity testing device for a GSM communication terminal of claim 11, further comprising:

a step threshold setting module, being configured to preset and store the step threshold.

13. The sensitivity testing device for a GSM communication terminal of claim 11, wherein:

the step threshold that is set in the system is 4.

14. An inspection apparatus for a communication terminal, comprising a sensitivity testing device for a GSM (Global System for Mobile Communications) communication terminal, wherein the sensitivity testing device for a GSM communication terminal comprising:

an RxQual acquiring module, being configured to acquire an RxQual;

an RxQual determining module, being configured to determine whether the RxQual is less than a step threshold that is set in a system; and a TCH (traffic channel) Level control module, being configured to reduce a TCH Level of the GSM communication terminal by one step value if the RxQual is less than the step threshold that is set in the system; and a Class II Ber (bit error rate) testing module, being configured to test the Class II Ber if the RxQual determining module determines that the RxQual is greater than or equal to the step threshold that is set in the system;

wherein when the RxQual is zero, the step value is set to be greater than a predetermined value for reducing a transmission power of a base station; and when the RxQual is not zero, the step value is set to be smaller than the predetermined value for improving an accuracy of the testing.

15. The inspection apparatus for a communication terminal of claim 14, the sensitivity testing device for a GSM communication terminal further comprising:

a step threshold setting module, being configured to preset and store the step threshold.

16. The inspection apparatus for a communication terminal of claim 14, wherein:

the step threshold that is set in the system is 4.

* * * * *